United States Patent
Van Holen et al.

(10) Patent No.: US 9,163,111 B2
(45) Date of Patent: Oct. 20, 2015

(54) AQUEOUS RADIATION CURABLE POLYURETHANE COMPOSITIONS

(75) Inventors: Jurgen Van Holen, Mariakerke (BE); Steven Cappelle, Ninove (BE); Xavier Deruyttere, Sint-Pieters-Leeuw (BE); Michel Tielemans, Wemmel (BE)

(73) Assignee: Allnex Belgium S.A., Brussels (BE)

( * ) Notice: Subject to any disclaimer, the term of this patent is extended or adjusted under 35 U.S.C. 154(b) by 587 days.

(21) Appl. No.: 13/002,676

(22) PCT Filed: Jul. 6, 2009

(86) PCT No.: PCT/EP2009/058519
§ 371 (c)(1),
(2), (4) Date: Jan. 5, 2011

(87) PCT Pub. No.: WO2010/003924
PCT Pub. Date: Jan. 14, 2010

(65) Prior Publication Data
US 2011/0112244 A1    May 12, 2011

(30) Foreign Application Priority Data
Jul. 10, 2008   (EP) .................... 08160100

(51) Int. Cl.
| | |
|---|---|
| *B05D 3/02* | (2006.01) |
| *B32B 27/00* | (2006.01) |
| *B32B 27/40* | (2006.01) |
| *C08G 18/08* | (2006.01) |
| *C08G 18/28* | (2006.01) |
| *C08K 3/20* | (2006.01) |
| *C08L 75/00* | (2006.01) |
| *C08G 18/67* | (2006.01) |
| *B05D 3/06* | (2006.01) |
| *C08F 283/00* | (2006.01) |
| *C08F 290/06* | (2006.01) |
| *C08F 290/14* | (2006.01) |
| *C08G 18/34* | (2006.01) |
| *C08G 18/73* | (2006.01) |
| *C09D 175/16* | (2006.01) |

(52) U.S. Cl.
CPC ............... *C08G 18/673* (2013.01); *B05D 3/06* (2013.01); *B32B 27/40* (2013.01); *C08F 283/006* (2013.01); *C08F 283/008* (2013.01); *C08F 290/067* (2013.01); *C08F 290/147* (2013.01); *C08G 18/0823* (2013.01); *C08G 18/348* (2013.01); *C08G 18/73* (2013.01); *C09D 175/16* (2013.01); *B05D 2201/02* (2013.01); *B05D 2203/20* (2013.01); *B05D 2401/20* (2013.01); *B05D 2503/00* (2013.01)

(58) Field of Classification Search
CPC .. B05D 3/06; B05D 2201/02; B05D 2203/20; B05D 2401/20; B05D 2503/00; B32B 27/40; C08F 283/006; C08F 283/008; C08F 290/067; C08F 290/147; C08G 18/0823; C08G 18/348; C08G 18/673; C08G 18/73; C09D 175/16
USPC ................. 524/507, 589, 590, 591, 839, 840; 525/123, 455; 427/372.2, 385.5; 428/423.1, 425.1
See application file for complete search history.

(56) References Cited

U.S. PATENT DOCUMENTS

| | | |
|---|---|---|
| 5,596,065 A | 1/1997 | Gerlitz et al. |
| 5,990,192 A | 11/1999 | Gerlitz et al. |
| 6,617,413 B1 | 9/2003 | Bruchmann et al. |
| 7,169,841 B2 | 1/2007 | Schwalm et al. |
| 2003/0153673 A1 | 8/2003 | Schwalm et al. |
| 2006/0079660 A1 | 4/2006 | Ludewig et al. |
| 2008/0135171 A1 | 6/2008 | Gruber et al. |
| 2008/0145563 A1 | 6/2008 | Heischkel et al. |
| 2008/0146691 A1 | 6/2008 | Kruger et al. |
| 2008/0182080 A1 | 7/2008 | Kruger et al. |
| 2008/0280139 A1 | 11/2008 | Wagner et al. |
| 2009/0298997 A1 | 12/2009 | Baumgart et al. |
| 2010/0098950 A1 | 4/2010 | Gruber et al. |

FOREIGN PATENT DOCUMENTS

| | | |
|---|---|---|
| DE | 102005008932 A1 | 8/2006 |
| EP | 0 694 531 | 1/1996 |
| EP | 1 645 582 | 4/2006 |
| EP | 1 707 600 | 10/2006 |
| EP | 1845143 A1 | 10/2007 |
| WO | 00/39183 | 7/2000 |
| WO | 02/00754 | 1/2002 |
| WO | 2005/118689 | 12/2005 |
| WO | 2006131259 A2 | 12/2006 |
| WO | 2007/054289 | 5/2007 |

(Continued)

OTHER PUBLICATIONS

European Notice of Opposition issued Oct. 31, 2012 in European Application No. 09780196.3.

(Continued)

*Primary Examiner* — Patrick Niland
(74) *Attorney, Agent, or Firm* — Wenderoth, Lind & Ponack, L.L.P.

(57) ABSTRACT

The present invention relates to an aqueous composition comprising from 5 to 90% by weight of a polymerizable ethylenically unsaturated water dispersible polyurethane (A) and from 1 to 60% by weight relative to the weight of polyurethane (A) of a least one polymerizable ethylenically unsaturated compound (B) having a water solubility at 25° C. of less than 50 g/l, and it use for making high gloss coatings as well as wood stains.

17 Claims, No Drawings

(56) References Cited

FOREIGN PATENT DOCUMENTS

| WO | 2007/063025 | 6/2007 |
|----|-------------|--------|
| WO | 2007/118781 | 10/2007 |
| WO | 2008000696 A1 | 1/2008 |

OTHER PUBLICATIONS

International Search Report for PCT/EP2009/058519, mailed Aug. 25, 2009.
English translation of the European Notice of Opposition by BASF filed on Oct. 22, 2012 in European Application No. 09780196.3.
English translation of the European Notice of Opposition by Bayer filed on Oct. 25, 2012 in European Application No. 09780196.3.
"Methacrylsäuremethylester," obtained from <http://de.wikipedia.org/wiki/Methacryls%C3%A4uremethylester> on Oct. 24, 2012, with partial English translation.
"Ethylmethacrylat," obtained from <http://de.wikipedia.org/wiki/Ethylmethacrylat> on Oct. 24, 2012, with partial English translation.
"Sicherheitsdatenblatt," BASF Sicherheitsdatenblatt gemäß Verordnung (EG) Nr. 1907/2006, BASF, Jun. 17, 2011, with partial English translation.
"EG-Sicherheitsdatenblatt," gemäß Verordnung (EG) 1907/2006, Evonik Industries, Feb. 19, 2009, with partial English translation.
"Sicherheitsdatenblatt," gemäß Verordnung (EG) 1907/2006, JOBAChem, Jan. 12, 2010, with partial English translation.
Japanese Office Action issued Sep. 24, 2013 in corresponding Application No. 2011-517118 (with English translation).
Chinese Office Action issued Nov. 20, 2012 in corresponding Application No. 200980121213.7 (with English translation).
Chinese Office Action issued Apr. 15, 2013 in corresponding Application No. 200980121213.7 (with English translation).

AQUEOUS RADIATION CURABLE POLYURETHANE COMPOSITIONS

This application is the U.S. National Phase application of International Application No. PCT/EP2009/058519, filed Jul. 6, 2009 and published as WO 2010/003924, which claims benefit of priority from European Patent Application No. 08160100.7, filed Jul. 10, 2008, each of which is incorporated by reference herein in its entirety.

The invention relates to aqueous radiation-curable polyurethane compositions especially suitable for making coatings on various substrates such as wood and plastics.

Radiation curable polyurethane dispersions are since long known to provide coatings for different substrates such as metals, different woods and plastics and show a good mechanical and chemical resistance as well as some flexibility.

Ethylenically unsaturated polyurethanes have been made from polyisocyanates, a mix of low and high molecular weight polyols and hydroxyfunctional ethylenically unsaturated monomers. The molecular weight of the resulting ethylenically unsaturated polyurethane prepolymers is sometimes increased even further by chain extension with polyamines. The resulting polymers generally have a very high molecular weight and are mostly physically drying, the so called tack free before radiation curing, due to a high content of hard segments or because their glass transition temperature Tg is sufficiently high. This is especially so when the polymer contains hard urea segments. Ethylenically unsaturated polyurethanes can also be made from the end capping of an isocyanate terminated polyurethane prepolymer with an ethylenically unsaturated, especially (meth)acrylated monomer.

A known drawback of these radiation curable compositions is their limited capability to provide very flat coatings, which makes them less suited for applications where an excellent mirror effect is desired. The compositions known in the art generally do not permit to obtain coatings which combine a high end hardness, scratch and stain resistance combined with an excellent mirror effect.

Radiation curable resins have also been used for making wood stains. Wood stains generally comprise pigments suspended in a "vehicle" of solvent, water or organic solvents, and a binding agent. They are formulated to transport dyes or extremely fine pigments into the pores of the wood surface rather than creating a film on top of the surface. As a result the stain adds color to the wood substrate without hiding its natural aspect. Typical difficulties related to wood stains are related to color variations, due to differences in wood absorption, even within the same piece. Also, pigments can migrate to the rollers during application of the sanding sealer. Known radiation curable wood stains have the disadvantage to stick to the brushes that are used after application of the radiation curable stain to ensure a good and uniform penetration of the stains into the wood structure. Regular cleaning of the brushes is tedious and expensive.

Surprisingly we have now found new radiation curable polyurethane dispersions which overcome these problems.

Therefore the present invention relates to an aqueous composition comprising:
  from 5 to 90% by weight of a polymerizable ethylenically unsaturated water dispersible polyurethane (A) obtained from the reaction of 10 to 60 weight % of at least one polyisocyanate (i), 3 to 20 weight % of at least one hydrophilic compound (ii) containing at least one reactive group capable to react with isocyanate groups and at least one group which is capable to render the polyurethane dispersible in aqueous medium either directly or after a reaction with a neutralizing agent to provide a salt, and 20 to 85 weight % of at least one polymerizable ethylenically unsaturated compound (iii) containing at least one reactive group capable to react with isocyanate groups; and
  from 1 to 60% by weight relative to the weight of polyurethane (A) of a least one polymerizable ethylenically unsaturated compound (B) having a water solubility at 25° C. of less than 50 g/l.

By polymerizable ethylenically unsaturated groups is meant to designate in the present invention carbon-carbon double bonds which under the influence of irradiation and/or a (photo)initiator can undergo radical polymerization. The polymerizable ethylenically unsaturated groups are generally chosen from (meth)acrylic and allylic groups, preferably (meth)acrylic groups, most preferably acrylic groups. In the present invention, the term "(meth)acryl' is to be understood as to encompass both acryl and methacryl compounds or derivatives as well as mixtures thereof.

The polymerizable ethylenically unsaturated water dispersible polyurethane (A) is preferably obtained by a process comprising a first step comprising the reaction of a stoechiometric excess of compound (i) with compound (iii), a second step comprising the reaction of the product of the first step with compound (ii) and a third step wherein the remaining free isocyanate groups provided by compound (i) are reacted to give allophanate groups.

This process can be carried out by reacting compounds (i) and (iii), and compound (ii), preferably under substantially anhydrous conditions and at a temperature between 20° C. and 130° C., more preferably between 30° C. and 100° C., until the reaction between the isocyanate groups and the isocyanate-reactive groups is substantially complete. The isocyanate content can be followed by titration with an amine.

The reactants are generally used in proportions corresponding to an equivalent ratio of isocyanate groups provided by compound (i) to isocyanate-reactive groups provided by compounds (ii) and (iii) of from about 1.05:1 to about 2:1, preferably from about 1.1:1 to 1.45:1. During this process, it is common to use catalysts to accelerate the reaction of the isocyanates towards hydroxyls and to use inhibitors in order to prevent the radical reaction of the reactive unsaturations. It is possible in the frame of this invention to use a sequential process during which compound (i) and/or compounds (ii) and/or (iii) are added incrementally in two or several portions, or with a continuous feed.

The compounds (ii) and (iii) are preferably used in a molar ratio (ii):(iii) of 1:2 to 1:10, more preferably from 1:2 to 1:5.

The third step preferably takes place at high temperature, usually from 80 to 130° C., preferably from 90 to 110° C. until the residual isocyanate content is lower than 0.5 meq/g, preferably lower than 0.1 meq/g.

In general, in a fourth step, the polyurethane obtained is dispersed in an aqueous medium by adding the polymer slowly into water or reversely by adding water to the polymer. Compound (B) can be added before the dispersion is made or after. Mostly addition before is preferred. Usually this dispersion proceeds under high sheer mixing. Usually the dispersion requires the preliminary neutralization of the hydrophilic groups provided by compound (ii), such as the carboxylic acid or sulfonic acid groups, into anionic salts. This is generally done by adding a neutralizing agent to the polymer or the water. Suitable neutralizing agents include ammonia, tertiary amines such as trimethylamine, triethylamine, triisopropylamine, tributylamine, N,N-dimethylcyclohexylamine, N,N-dimethylaniline, N-methylmorpholine, N-methylpiperazine, N-methylpyrrolidine and N-methylpiperidine and inorganic bases comprising monovalent metal cations, preferably alkali metals such as lithium, sodium and potassium and anions such as hydroxides, hydrides, carbonates and bicarbonates. Preferred are alkali metal hydroxides. Most preferred is sodium hydroxide.

The total amount of these neutralizing agents can be calculated according to the total amount of acid groups to be neutralized. Generally a stoechiometric ratio of about 0.3:1 to 1.1:1 is used. Preferably the stoechiometric ratio is from 0.3:1 to 0.95:1 so that not all acid groups are neutralized.

The polymerizable ethylenically unsaturated water dispersible polyurethane (A) preferably contains at least 0.2 meq of allophanate groups —NH—CO—N—CO—O— per g of polyurethane (solid). More preferably the content of allophanate groups in the polyurethane (A) is at least 0.3 meq/g. The content usually does not exceed 1 meq/g.

The polymerizable ethylenically unsaturated water dispersible polyurethane (A) generally has a double bond equivalent (number of milli-equivalents of ethylenic double bonds per g of solid) of from 1 to 6 meq/g, preferably of from 2 to 4 meq/g. The amount of (meth)acrylated and ethylenically unsaturated groups is usually measured by nuclear magnetic resonance spectroscopy and is expressed in meq per g of solid material. A sample of the composition is dried for 1 day at room temperature and 12 h at 60° C. and then dissolved in N-methylpyrrolidinone. The sample is submitted to 1H-NMR analysis in order to measure the molar concentration of (meth)acrylated and ethylenically unsaturated groups using 1,3,5-bromobenzene as internal standard. The comparison between the peak assigned to aromatic protons of the internal standard and the peaks assigned to the (meth)acrylated and ethylenically unsaturated double bonds allow to calculate the molar concentration of (meth)acrylated and ethylenically unsaturated groups according to the formula (A×B)/C wherein A is the integration of 1H double bonds provided by the sample, B is the number of moles of the internal standard in the sample and C is the integration of 1H provided by the internal standard.

Alternatively, the amount of (meth)acrylated and ethylenically unsaturated groups can also be measured by a titration method following the addition of an excess of pyridinium sulfate dibromide on said unsaturated groups (within glacial acetic acid as solvent and mercury acetate as catalyst). Said excess liberates iodine in the presence of potassium iodide and the iodine is then titrated with sodium thiosulfate.

The polymerizable ethylenically unsaturated water dispersible polyurethane (A) preferably is non physically drying or tacky before cure.

Polymerizable ethylenically unsaturated water dispersible polyurethanes have for example been described in U.S. Pat. No. 5,596,065.

By polyisocyanate compound (i) is meant to designate organic compounds comprising at least two isocyanate groups. The polyisocyanate compound usually comprises not more than three isocyanate groups. The polyisocyanate compound (i) is most preferably a di-isocyanate. The polyisocyanate compound is generally selected from aliphatic, cycloaliphatic, aromatic and/or heterocyclic polyisocyanates or combinations thereof.

Examples of aliphatic and cycloaliphatic polyisocyanates are 1,6-diisocyanatohexane (HDI), 1,1'-methylene bis[4-isocyanatocyclohexane] (H12MDI), 5-isocyanato-1-isocyanatomethyl-1,3,3-trimethyl-cyclohexane (isophorone diisocyanate, IPDI). Aliphatic polyisocyanates containing more than two isocyanate groups are for example the derivatives of above mentioned diisocyanates like 1,6-diisocyanatohexane biuret and isocyanurate. Examples of aromatic polyisocyanates are 1,4-diisocyanatobenzene (BDI), 2,4-diisocyanatotoluene (2,4-TDI), 2,6-diisocyanatotoluene (2,6-TDI), 1,1'-methylenebis[4-isocyanatobenzene] (MDI), xylylene diisocyanate (XDI), tetramethylxylylene diisocyanate (TMXDI), 1,5-naphtalene diisocyanate (NDI), tolidine diisocyanate (TODI) and p-phenylene diisocyanate (PPDI).

The polyisocyanate is preferably selected from aliphatic and cycloaliphatic polyisocyanates, more preferably diisocyanates. Especially preferred is 1,6-diisocyanatohexane (HDI).

The amount of polyisocyanate compound (i) used for the synthesis of the polyurethane polymer (A) is generally in the range of from 10 to 60 wt % of the polyurethane polymer (A), preferably from 10 to 50 wt % and more preferably from 20 to 40 wt %.

The hydrophilic compound (ii) is generally a polyol comprising a functional group that can exhibit an ionic or non-ionic hydrophilic nature. Preferably it is a polyol containing one or more anionic salt groups, such as a carboxylate and sulfonate salt groups or acid groups which may be converted to an anionic salt group, such as carboxylic acid or sulfonic acid groups. Preferred are hydroxycarboxylic acids represented by the general formula $(HO)_x R(COOH)_y$, wherein R represents a straight or branched hydrocarbon residue having 1 to 12 carbon atoms, and x and y independently are integers from 1 to 3. Examples of these hydroxycarboxylic acids include citric acid, malic acid, lactic acid and tartaric acid. The most preferred hydroxycarboxylic acids are the α,α-dimethylolalkanoic acids, wherein x=2 and y=1 in the above general formula, such as for example, 2,2-dimethylolpropionic acid and 2,2-dimethylolbutanoic acid.

The amount hydrophilic compound (ii) generally is from 3 to 25% by weight of the polyurethane polymer (A), preferably of from 5 to 20% by weight.

Polymerizable ethylenically unsaturated compound (iii) that have one or more reactive groups capable to react with isocyanate groups and at least one (meth)acrylated group are preferred.

Compounds containing one or more unsaturated function such as acrylic or methacrylic group and essentially one nucleophilic function capable of reacting with isocyanate, preferably an hydroxyl group, are preferred. More preferred are (meth)acryloyl mono-hydroxy compounds, more particularly poly(meth)acryloyl mono-hydroxy compounds. Acrylates are particularly preferred.

Useful compounds include the esterification products of aliphatic and/or aromatic polyols with (meth)acrylic acid having a residual average hydroxyl functionality of about 1. The partial esterification products of (meth)acrylic acid with tri-, tetra-, penta- or hexahydric polyols or mixtures thereof are preferred. In this context, it is also possible to use reaction products of such polyols with ethylene oxide and/or propylene oxide or mixtures thereof, or reaction products of such polyols with lactones, which add to these polyols in a ring-opening reaction. Examples of suitable lactones are γ-butyrolactone and, in particular δ-valerolactone and ε-caprolactone. Preferred are those alkoxylated polyols having not more than three alkoxy groups per hydroxyl functionality and ε-caprolactone-modified polyols. These modified or unmodified polyols are partly esterified with acrylic acid, methacrylic acid or mixtures thereof until the desired residual hydroxyl functionality is reached.

Particularly preferred are compounds comprising at least two (meth)acryl functions such as glycerol diacrylate, trimethylolpropane diacrylate, glycerol diacrylate, pentaerythritol triacrylate, ditrimethylolpropane triacrylate, dipentaerythritol pentaacrylate and their (poly)ethoxylated and/or (poly)propoxylated equivalents.

Compounds obtained from the reaction of (meth)acrylic acid with aliphatic, cycloaliphatic or aromatic compounds bearing an epoxy functionality together with at least one (meth)acrylic functionality can be used as well. Compounds obtained from the reaction of an aliphatic, cycloaliphatic or aromatic acid with an epoxy group containing (meth)acrylate, such as glycidyl (meth)acrylate, can also be used.

Other suitable compounds are the (meth)acrylic esters with linear and branched polyols in which at least one hydroxy functionality remains free, like hydroxyalkyl(meth)acrylates having 1 to 20 carbon atoms in the alkyl group. Preferred molecules in this category are hydroxyethyl (meth)acrylate, hydroxypropyl (meth)acrylate, hydroxybutyl (meth)acrylate.

In a preferred embodiment mixtures of two or more unsaturated compounds (iii) are used.

The amount hydrophilic compound (iii) generally is from 20 to 85% by weight of the polyurethane polymer (A), preferably of from 35 to 85% by weight, more preferably from 45 to 75% by weight.

Preferably the polymerizable ethylenically unsaturated water dispersible polyurethane (A) is essentially free from saturated polyols, in particular is essentially free from saturated polyester polyols.

In general the weight average molecular weight (Mw) of the polyurethane (A) of the invention is between 3000 and 8000, more preferably between 3000 and 6000. Preferably the number average molecular weight (Mn) is between 1800 and 3500. Preferably the polydispersity index Mw/Mn is between 1 and 3, most preferably around 2. The number average molecular weight Mn and weight average molecular weight Mw are measured by GPC (in THF on a 3×PLgel 5 μm Mixed-D LS 300×7.5 mm column MW range 162 to 377400 g/mol calibrated with polystyrenes standards, at 40° C.). The polymerizable ethylenically unsaturated compound (B) having a water solubility of less than 50 g/l is preferably selected from (meth)acrylated compounds comprising one or more (meth)acryl groups. Preferred compounds (B) are those with have a water solubility at 25° C. of less than 10 g/l, more specifically less than 5 g/l. Particularly preferred are those which are substantially not water soluble.

Examples of such compounds (B) include epoxy (meth) acrylates, polyester(meth)acrylates, (meth)acrylic(meth) acrylates and lower molecular weight (meth)acrylates, as well as mixtures thereof. By lower molecular weight (meth) acrylates is understood (meth)acrylates having a molecular weight (Mw) of at most 1000, preferably at most 500. By "lower molecular weight (meth)acrylates" is meant to designate (trans)esterification products of (a) polyols and/or epoxides and (b) (meth)acrylic acids and/or their esters. The (meth)acrylates (B) of the invention may optionally be aminated afterwards.

Polyols (a) used in the preparation of the (meth)acrylates (B) of the invention may be modified polyols such as the reaction products with ethylene oxide and/or propylene oxide and/or lactones. Epoxides (a) used are in particular polyepoxides such as the glycidylethers and/or diglycidylethers of polypropyleneglycol (PPG).

The reaction between (meth)acrylates and amines is known as a Michael addition. In general primary amines and/or secondary amines are used in the preparation of these amino(met)acrylates. Examples of suitable primary and secondary amines are well known in the art and are described in e.g. WO 2008/000696 and WO 2006/131259.

The (meth)acrylates of the invention may be used in admixture with one or more of the following; urethane (meth) acrylates, epoxy (meth)acrylates, polyester(meth)acrylates and (meth)acrylic(meth)acrylates; preferably those with a molecular weight (Mw) of at most 1000, preferably at most 500.

Preferably compound (B) is a monomer or reactive diluent.

According to a first and preferred embodiment according to the invention, compound (B) is selected from (meth)acrylated compounds comprising at least two (meth)acryl groups and at most one other functional group. Particularly preferred are (meth)acrylated compounds comprising at most one hydroxyl group. The esterification products of (meth)acrylic acid with polyols comprising at least 2 hydroxyl groups having an average residual hydroxyl functionality of at most 1, preferably less than 1, are preferred. Particularly preferred are non-alkoxylated compounds. Optionally these (meth)acrylated compounds (B) are aminated afterwards.

According to this first embodiment, compound (B) is preferably selected from hexanediol di(meth)acrylate, trimethylolpropane tri(meth)acrylate, glycerol tri(meth)acrylate, pentaerythritol tri(meth)acrylate, pentaerythritol tetra(meth) acrylate, di-trimethylolpropane tetra(meth)acrylate, di-pentaerythritol hexa(meth)acrylate and mixtures thereof. Preferred are compounds (B) having from 2 to 6 (met)acrylate groups, more in particular from 3 to 4 (meth)acrylate groups. Particularly preferred are trimethylolpropane tri(meth)acrylate, pentaerythritol tri(meth)acrylate and pentaerythritol tetra(meth)acrylate.

According to a second preferred embodiment according to the invention, compound (B) is selected from alkoxylated (meth)acrylated compounds. Preferred compounds are ethoxylated and/or propoxylated compounds. More preferred are compounds having a degree of alkoxylation of 0.3 to 3, especially from 1 to 2, alkoxy groups per (meth)acryl group. Optionally these (meth)acrylated compounds (B) are aminated afterwards.

Particularly preferred are (meth)acrylated compounds comprising at least two (meth)acryl groups, especially the esterification products of (meth)acrylic acid with alkoxylated polyols comprising at least 2 hydroxyl groups and from 0.3 to 3 alkoxy groups per hydroxyl group. According to this second embodiment, compound (B) is preferably selected from alkoxylated neopentylglycol di(meth)acrylates and alkoxylated trimethylolpropane tri(meth)acrylates.

The amount of compound (B) generally is from 1 to 60% by weight of the weight of polyurethane (A), preferably from 15 to 50, more preferably from 25 to 50% by weight.

The aqueous radiation curable composition according to the invention preferably contains from 10 to 60%, more preferably from 25 to 50%, by weight of polyurethane (A), from 3 to 30%, more preferably from 5 to 20%, by weight of compound (B) and from 20 to 80%, more preferably from 30 to 70% of water.

The composition may further contain one or more photoinitiator and/or a variety of other additives such as rheology modifiers, thickeners, coalescing agents, antifoam agents, wetting agents, adhesion promoters, flow and leveling agents, biocides, surfactants, stabilizers, anti-oxidants, wax, fillers, pigments, dyes and tints.

The radiation curable composition can be obtained by addition of compound (B) to the polyurethane (A) before, during or after its dispersion in water. Compound (B) can also be added during the synthesis of polyurethane (A). Especially when compound (B) does not contain a functional group that can react with any of compounds (i), (ii) or (iii), it can be added before, during or after any of the second, third or fourth step of the preparation process of polyurethane (A).

The present invention also relates to a process for the preparation of a radiation-curable compositions such as described here above, said process comprising a first step comprising the reaction of compounds (i) and (iii), a second step, comprising the reaction of the product of the first step with a compound (ii), a third step wherein the product obtained after the second step is further reacted until the residual isocyanate content is lower than 1 meq/g;

a fourth step comprising the dispersion in an aqueous medium of the polyurethane obtained after the third step, an optional step comprising the reaction with a neutralizing agent in order to convert the hydrophilic groups provided by compound (ii) into anionic salts, a step comprising the addition of an ethylenically unsaturated compound (B).

The neutralization step can be done before, during or after the fourth step.

The addition of the ethylenically unsaturated compound (B) can be done after the second, third step or fourth step of the reaction. When the ethylenically unsaturated compound (B) is a compound comprising no functional groups which are capable to react with isocyanate groups, the compound can in addition be added before or during the second step of the reaction.

The composition and process according to the present invention are advantageous in that they are able to provide dispersions with low volatile organic content (VOC), a high solids content, a low viscosity, a low particle size, an excellent stability and a low film formation temperature. The compositions of the invention are e.g. stable for at least 10 days at 60° C.

The aqueous dispersions of the invention generally have a total solids content of from about 30 to 60 wt %, preferably from about 40 to 55 wt %; a viscosity measured at 25° C. of less then 500 mPa s, preferably less then 200 mPa s, a pH value of 6 to 11, preferably of 6 to 8.5, an average particle size of about 10 to 1000 nm, preferably 30 to 150 nm. The film formation temperature preferably ranges from 0 to 20° C., more preferably from 0 to 5° C.

The aqueous dispersions of the invention advantageously are tacky before cure. Tackiness before cure advantageously is low for dispersions of the present invention. Tackiness before cure usually is at most 8 N/25 mm, preferably at most 5 N/25 mm, more preferably at most 3N/25 mm. Most preferably tack before cure does not exceed 2 N/25 mm, as determined by Tack loop measurements according to FINAT FTM 9. Tackiness before cure in general is at least 0.1 N/25 mm, preferably at least 0.2 N/25 mm more preferably at least 0.4 N/25 mm.

Advantageously the aqueous dispersions of the invention are not dry before cure.

The radiation-curable compositions according to the present invention are preferably curable by ultraviolet irradiation, generally in the presence of photoinitiator. They can also be cured by electron-beam irradiation, allowing the use of compositions free of photoinitiator. The compositions according to the invention are providing extremely rapid curing.

The coatings obtained from the compositions according to the invention result in selective mechanical properties (harder and softer) and polymer polarity (more hydrophilic or hydrophobic) that allow to cover many different application areas as, for example, coatings for wood, plastic, glass, metal and concrete. The compositions according to the invention are also suitable for making as inks and overprint varnishes.

The compositions according to the invention, especially those according to the first embodiment, permit to obtain coatings which after radiation curing show an excellent chemical resistance against water, solvents and stains, a superior mechanical resistance against scratch and abrasion—while still giving an excellent gloss and mirror effect. These coatings also exhibit a good adhesion on porous and non-porous substrates. The optical properties care for good transparency and high gloss. The compositions according to the invention are particularly suitable for making coatings for wood furniture and plastic coatings with an excellent mirror effect. The compositions according to the invention are also particularly suitable for coating wood substrates and plastic articles, especially 3-dimensional objects made from polyethylene, polypropylene, polycarbonate, polyvinylchloride, optionally precoated with other coatings such as polyurethanes.

The compositions according to the invention, especially those according to the second embodiment, are particularly suitable for UV stain applications on wood. They present an excellent compatibility and stability with stains, low foaming, low stickiness to brushes, a very low tack. The stains based on the compositions according to the invention are absorbed more evenly into wood, resulting in a more uniform color aspect. The present an excellent anfeuerung aspect and adhesion on wood. Moreover they have excellent primer properties. Hence the compositions combine excellent adhesion properties necessary for primers as well as the desired properties necessary for stain applications. They permit to replace the two step process wherein a stain and primer are applied to the wood in two different layers by a one shot process wherein stain and primer are combined.

The present invention therefore also relates to the use of the compositions for making inks, varnishes or coatings and to a process for making inks, varnishes or coatings wherein a composition as described here above is used. The present invention also relates to process for preparing a coated substrate or article comprising a step wherein the substrate or article is coated with a radiation curable composition according to the invention, and preferably, further submitted to curing, particularly under irradiation with UV light or electron beam.

The present invention more particularly relates to a process and the use of the compositions for making high gloss coatings, especially on wood and plastic substrates. The compositions according to the first embodiment described here above are particularly suitable therefore.

The present invention more particularly relates to a process and the use of the compositions for making wood coatings. The compositions according to the second embodiment described here above are particularly suitable therefore.

The present invention also relates to an article or substrate coated or treated with, either partially or entirely, with a composition of the invention. Preferably articles or substrates are made from wood or plastic.

The examples which will follow illustrate the invention without limiting it.

PREPARATION EXAMPLE 1

Preparation of an Aqueous Polyurethane Dispersion

A double-wall glass reactor equipped with a mechanical stirrer, a thermocouple, a vapor condenser and a dropping funnel was charged with 109.6 g 1,6-hexamethylenediisocyanate and 0.14 g bismuth octoate. The reaction mixture was heated and a mixture of 194.2 g of the reaction product of 1 mole of ethoxylated trimethylolpropane TMP-3EO with 2 moles of acrylic acid, 55.5 g of the monofunctional epoxyacrylate Ebecryl®113 and 1.1 g 4-methoxyphenol was slowly added to the reactor under air-sparge. Maturation was done until a isocyanate content of 1.79 meq/g was reached. Then 35.1 g dimethylol propionic acid and 1.1 g 4-methoxyphenol was added to the reaction mixture and the mass temperature was heated to 95° C. Maturation was done at 95° C. until an isocyanate content <0.02 meq/g was obtained. The reaction mixture was cooled down and 23.4 g of an aqueous solution of 25 wt % sodium hydroxide was added to the reactor. After starting the addition of the NaOH solution, the reaction mixture was further cooled and 577.5 g of demineralised water was slowly added to the reactor under high shear agitation. The dispersion was cooled down to room temperature and filtered over a 5 μm filter bag. and its solid content was adjusted to 40% by adding water. The dry content was measured by gravimetric method.

The viscosity of the dispersion was 33 mPa·s (measured at 25° C. with a Brookfield RVT viscometer using spindle N° 1 at 50 rpm).

The polyurethane had a content of allophanate groups of 0.38 meq/g of solid polyurethane.

The average particle size of the aqueous polymer dispersion was 94 nm (measured by laser light scattering using a Malvern Autosizer Particle Analyzer).

The colloidal stability was assessed by observing the decantation and/or phase separation on a 200 g sample placed in an oven at 60° C.; no product deterioration was observed after 10 days.

EXAMPLE 1

10 parts of trimethylpropane triacrylate were added to 85.5 parts of the UV curable polyurethane dispersion of preparation example 1. The composition was then formulated with 3% of a photo-initiator (Additol® BCPK) and the viscosity was adjusted to about 1500 mPa·s (Brookfield) using the thickener UCECOAT®8460:water (1:1) up to a maximum of 2%, and evaluated as to its dispersion stability.

The properties of the composition and the coatings obtained therewith are represented in Table 1
Stability (of the dispersion): After the standard test is performed—10 days at 60° C.—the dispersion/emulsion is inspected for any sedimentation or other change, for example in particle size or pH. The sample is approved if no important changes are noticed.
Stain resistance: The method covers the chemical resistance of a coating of 36μ wet applied to a non-porous substrate (half white, half black Leneta paper). The coating was dried for 5 minute at 60° C. and then cured under UV-lamp (Hg) of 80 W/cm at 5 m/min. The resistance is assessed by putting a test substance on the coating, covered with a microscope glass and left for 4 to 16 hours. The test substances used are mustard, coffee and red wine. The stains are washed with a couple of rubs using a tissue saturated with isopropanol. The remaining stains are assessed visually using a 1-5 scale, 5=best. A high value (5) is expected to provide the best protection against any household product spillage.
Mirror effect: The method visually judges the quality of the reflected image, using a 1-5 scale, 5=highest quality reflection. A high value is needed for applications where the reflected image is an important feature.

COMPARATIVE EXAMPLES 2 AND 3

In comparative example 2, 10 parts of a water soluble polyether triacrylate EBECRYL®12 were used in stead of trimethylolpropane triacrylate.

In comparative example 3, the trimethylol propane triacrylate was omitted.

EXAMPLE 4

In example 4 the trimethylolpropane triacrylate was replaced with a mix of pentaerythritol tri-acrylate and pentaerythritol tetra-acrylate.

TABLE 1

|  | Example 1 | Comp. Ex. 2 | Comp. Ex. 3 | Example 4 |
| --- | --- | --- | --- | --- |
| Stability (10 d. 60° C.) | OK | Not stable | OK | OK |
| Mirror effect on PVC | 5 | 5 | 3 | 5 |
| Mirror effect on base coat | 4-5 | 4-5 | 2 | 4-5 |
| Gloss (60°) | >80 | >80 | >80 | >80 |
| Stain resistance |  |  |  |  |
| mustard | 5 | 2 | 4 | 5 |
| coffee | 5 | 3.5 | 4.5 | 5 |
| wine | 5 | 5 | 5 | 5 |

Comparing Examples 1 and 4 with comparative examples 2 (containing a water soluble acrylate) and 3 (containing no acrylate) shows the better performances of the compositions according to the invention permitting to obtain coatings having an improved stain resistance as well as mirror effect, especially the combination of a high quality reflected image with an excellent stain resistance.

Despite the fact that the composition according to Comparative Example 3 presented a relatively high gloss, no mirror effect was obtained.

Comparative Example 2 shows that water-soluble acrylates did not permit to obtain highly stable compositions.

EXAMPLE 5

Dispersions were made by mixing 15 parts of propoxylated neopentyl glycol diacrylate commercialized as EBECRYL®145, 80 parts of the UV curable polyurethane dispersion of preparation example 1 and 22.5 parts of water. The dispersions were evaluated as to their stability at 60° C. and their tackiness, as measured with a Tack-O-Scope (Testprint) at 20 m/min at 25° C.—using 0.3 g of the product. The results are presented in Table 2.

COMPARATIVE EXAMPLES 6R TO 9R

Dispersions were prepared and evaluated as in Example 5 except that the propoxylated neopentyl glycol diacrylate was omitted (in comparative example 6R) or replaced by water-soluble acrylates, respectively, in comparative example 7R: polyethylene glycol 600 diacrylate (commercialized under the name of EBECRYL®11), in comparative example 8R: polyether triacrylate commercialized under the name of EBECRYL®12 and in comparative example 9R: polyethylene glycol 400 diacrylate (commercialized under the name of EBECRYL®13). The results are presented in Table 2.

EXAMPLE 10

Dispersions were prepared and evaluated as in Example 5 except that the propoxylated neopentyl glycol diacrylate was replaced by an ethoxylated trimethylolpropane triacrylate commercialized under the name of EBECRYL®853. The results are presented in Table 2.

TABLE 2

| Example | 5 | 6R | 7R | 8R | 9R | 10 |
|---|---|---|---|---|---|---|
| Stability (10 d. 60° C.) | OK | OK | Not stable | Not stable | Not stable | OK |
| Tackiness | 195 | 850 | | | | 210 |

The results show that the use of watersoluble acrylates did not permit to obtain stable dispersions that could be used for making UV-stains.

The compositions according to the invention presented a significant lower tackiness making them particularly suitable for making UV stains.

The compositions of Example 5 and comparative example 6R were formulated with pigments and their color stability was tested. The composition of Example 5 showed a significant better color stability than the one of comparative example 6R. Moreover this composition showed an unexpected low foaming.

The compositions of Examples 5 and 10 and Comparative Example 6R were further evaluated as to their adhesion and scratch resistance.

Therefore the compositions were formulated with a photoinitiator (Additol®BCPK), a thickener UCECOAT®8460, water and pigments (weight ratio: 23.75 p composition, 75 p water, 4 p photoinitiator, 1 p thickener and 10 p pigments) and applied on beech panels by spray (35 g/m$^2$), dried at 40-50° C. and cured under UV-light. Then 3×18 g/m$^2$ UV-curable sealer was applied and cured and 10 g/m$^3$ of UV-curable topcoat was applied and cured.

The results obtained are presented in table 3.

TABLE 3

| Example | 5 | 6R | 10 |
|---|---|---|---|
| Adhesion | excellent | excellent | excellent |
| Erichsen (N) | 12 | 9 | 12 |
| Hamberger (N) | 20 | 20 | 22 |

The results demonstrate that the compositions according to the invention show a very good adhesion and scratch resistance properties which are improved in comparison with the compositions not containing water insoluble acrylates.

The results of table 2 and 3 demonstrate that the compositions according to the invention are particularly suitable for being used as UV-stains.

EXAMPLE 11

Plastic Coating

A dispersion prepared as described in Example 4 was applied (30 μm wet) on polycarbonate (PC) with Dr blade, dried for 10 minutes at 40° C. and then cured under UV lamp (Hg) of 80 W/cm at 2×10 m/min. Reactivity, adhesion (tape removal) and stain resistance were tested. Besides adhesion on PC, adhesion was also tested on polyvinylchloride (PVC) and polyethylene terephthalate (PET).

For the evaluation of hardness and scratch resistance a 50 μm thick coating was applied on glass with Dr blade, dried for 10 minutes at 40° C. and then cured under UV lamp (Hg) of 80 W/cm at 3 times reactivity.

Reactivity: The method covers the minimum UV-dose which is necessary to fully crosslink a coating applied and cured as described here above. The minimum dose is defined by the speed of the conveyer (m/min) that allows a solvent resistance equal or superior to 100 acetone double rubs. The rubs are made with a piece of cotton rag saturated with acetone; one double rub is equal to a forward and backward stroke on the coated surface. The reported number is the number of double rubs required to break through the coating.

Adhesion: The method covers the adhesion of a coating applied and cured as described here above. 5 cuts of ~1 cm and spaced by ~1 mm are made in the coating using a knife, followed by 5 similar cuts in the transversal direction. The adhesion was measured using an adhesive tape firmly pressed on the cross-cut coating and removed rapidly; the damage to the cross-cut surface area of the coating due to adhesion loss is expressed in a 1-5 scale, 5=best. A high adhesion (5) is necessary to ensure a strong permanent bond between the coating and the substrate.

Stain resistance: The method covers the chemical resistance of a coating applied and cured as described here above. The resistance is assessed by putting a test substance on the coating, covered with a microscope glass and left for 4 to 16 hours, unless otherwise indicated. The stains are washed with a couple of rubs using a tissue saturated with isopropanol. The remaining stains are assessed visually using a 1-5 scale, 5=best.

Hardness: The method covers the surface hardness of a coating applied and cured as described here above. The coated samples are stabilized during 24 hours in a conditioned room (20° C., 50% humidity) and a pendulum hardness (Persoz) is determined in seconds on 3 places of the surface. The mean value is calculated.

Scratch resistance: The method covers the scratch resistance of a coating applied and cured as described here above. The scratch is assessed at room temperature using a piece of steel wool attached on a 800 g hammer and rubbed on the coated surface with a forward and backward motion. The reported number is the number of single rubs required to damage the surface and provide a visible loss of gloss due to abrasion.

The results obtained are presented in Table 4.

TABLE 4

| Example | 11 |
|---|---|
| Reactivity | 15 m/min |
| Adhesion | |
| PC | 5 |
| PVC | 5 |
| PET | 5 |
| Stain resistance | |
| NH3(10%)/H2O | 5-5-5-5 |
| EtOH (48)/H2O | 5-5-5-5 |
| Kiwi (1 h) (IPA) | 5 |
| Tar (1 h) (IPA) | 5 |
| Marker N 70 (5') (IPA) | 5 |
| Hardness | 340 |
| Scratch resistance | 3 |

Tack Before Cure:

Compositions of Examples 4 and 5 and compositions exemplified in EP-A-1845143 or U.S. Pat. No. 5,596,065 (comparative examples 13R and 14R respectively) were subjected to tack measurements. Tack before cure was herein measured using a tack loop method according to FINAT FTM 9. Tack free=0; Low tack=0-2; Tacky=2-5; Very tacky:>5.

The results obtained are presented in Table 5.

TABLE 5

| Example | 4 (11) | 5 | 13R | 14R |
|---|---|---|---|---|
| Fmax N/25 mm | 1 | 0.5 | 0 | 7 |

Only compositions according to the invention permitted to obtain coatings having a mirror effect without sanding or polishing.

The invention claimed is:

1. An aqueous composition comprising:
   from 5 to 90% by weight of a polymerizable ethylenically unsaturated water dispersible polyurethane (A) containing at least 0.2 meq/g of allophanate groups and obtained from the reaction of 10 to 60 weight % of at least one polyisocyanate (i), 3 to 25 weight % of at least one hydrophilic compound (ii) containing at least one reactive group capable to react with isocyanate groups and at least one group which is capable to render the polyurethane dispersible in aqueous medium either directly or after a reaction with a neutralizing agent to provide a salt, and 20 to 85 weight % of at least one polymerizable ethylenically unsaturated compound (iii) containing at least one reactive group capable to react with isocyanate groups; and
   from 15 to 60% by weight relative to the weight of polyurethane (A) of at least one polymerizable ethylenically unsaturated compound (B) having a water solubility at 25° C. of less than 50 g/l, wherein compound (B) is a (meth)acrylate with a weight average molecular weight of at most 1000.

2. The aqueous composition according to claim 1, wherein the polyurethane (A) is obtained by a process comprising the reaction of a stoichiometric excess of polyisocyanate (i) with polymerizable ethylenically unsaturated compound (iii), a second step comprising the reaction of the product of the first step with hydrophilic compound (ii) and a third step wherein the remaining free isocyanate groups provided by polyisocyanate (i) are reacted to give allophanate groups.

3. The aqueous composition according to claim 1, wherein the polyurethane (A) contains from 1 to 6 meq/g of ethylenically unsaturated double bonds.

4. The aqueous composition according to claim 1, wherein the polyisocyanate is selected from aliphatic and cycloaliphatic polyisocyanates.

5. The aqueous composition according to claim 1, wherein the hydrophilic compound (ii) is selected from a,a-dimethylolalkanoic acids.

6. The aqueous composition according to claim 1, wherein the polymerizable ethylenically unsaturated compound (iii) is selected from poly(meth)acrylolyl mono-hydroxy compounds.

7. The aqueous composition according to claim 1, wherein the polymerizable ethylenically unsaturated compound (B) has a water solubility at 25° C. of less than 10 g/l.

8. The aqueous composition according to claim 1, wherein the polymerizable ethylenically unsaturated compound (B) is selected from (meth)acrylated compounds comprising at least two (meth)acryl groups and at most one other functional group.

9. The aqueous composition according to claim 8, wherein the (meth)acrylated compound comprising at least two (meth)acryl groups and at most one other functional group is selected from hexanediol di(meth)acrylate, trimethylolpropane tri(meth)acrylate, glycerol tri(meth)acrylate, pentaerythritol tri(meth)acrylate, pentaerythritol tetra(meth)acrylate, di-trimethylolpropane tetra(meth)acrylate, di-pentaerythritol hexa(meth)acrylate and mixtures thereof.

10. The aqueous composition according to claim 1, wherein the polymerizable ethylenically unsaturated compound (B) is selected from alkoxylated (meth)acrylated compounds.

11. The aqueous composition according to claim 10, wherein the alkoxylated (meth)acrylated compound is selected from the esterification products of (meth)acrylic acid with alkoxylated polyols comprising at least 2 hydroxyl groups and from 0.3 to 3 alkoxy groups per hydroxyl group.

12. A process for the preparation of a radiation-curable composition according to claim 1, said process comprising
   a first step comprising the reaction of compounds (i) and (iii),
   a second step, comprising the reaction of the product of the first step with a compound (ii),
   a third step wherein the product obtained after the second step is further reacted until the residual isocyanate content is lower than 1 meq/g,
   a fourth step comprising the dispersion in an aqueous medium of the polyurethane obtained after the third step,
   an optional step comprising the reaction with a neutralizing agent in order to convert the hydrophilic groups provided by compound (ii) into anionic salts, and
   a step comprising the addition of an ethylenically unsaturated compound (B).

13. A process for preparing a coated substrate or article, wherein the substrate or article is coated with a composition according to claim 1.

14. The process according to claim 13, wherein the substrate or article is a plastic or wood substrate or article, and wherein a composition according to claim 8 is used.

15. The process according to claim 13, wherein the substrate or article is a wood substrate or article, and wherein a composition according to claim 10 is used as a UV stain.

16. The aqueous composition according to claim 1, comprising
   from 15 to 50% by weight relative to the weight of polyurethane (A) of a least one polymerizable ethylenically unsaturated compound (B) having a water solubility at 25° C. of less than 50 g/l, wherein compound (B) is a (meth)acrylate with a weight average molecular weight of at most 1000.

17. The aqueous composition according to claim 1, comprising
   from 25 to 50% by weight relative to the weight of polyurethane (A) of a least one polymerizable ethylenically unsaturated compound (B) having a water solubility at 25° C. of less than 50 g/l, wherein compound (B) is a (meth)acrylate with a weight average molecular weight of at most 1000.

* * * * *